United States Patent Office.

ABRAHAM B. McKEON, OF RUTHERFORD PARK, NEW JERSEY.

Letters Patent No. 93,659, dated August 10, 1869.

IMPROVED COMPOSITION-CEMENT FOR PAVEMENTS.

The Schedule referred to in these Letters Patent and making part of the same.

*To all whom it may concern:*

Be it known that I, ABRAHAM B. McKEON, of Rutherford Park, county of Bergen, State of New Jersey, have invented and discovered a new and useful composition or combination of matter, forming a cement to be used and employed in the manufacture and preparation of so-called concrete pavements, or coverings for walks, streets, squares, floors, roofs, and the like.

The nature and object of the invention are the production of a substance which shall readily penetrate among, and firmly unite or bind together, pebbles and other like hard substances, retaining them firmly in their relative position to each other, and at the same time itself possess a proper degree of hardness, combined with a proper degree of elasticity, so that the pavement or covering shall present a surface capable, from its hardness and tenacity, of withstanding blows, weights, wear, and friction, and yet be so yielding as to afford a firm and easy hold to the foot of man and beast; and I claim that the substance or compound, invented and discovered by me, possesses these qualities, in a degree superior to that of any other compound hitherto known or employed.

The following is a description of the said invention or discovery.

It is a combination of the common tar of commerce, with the common rosin of commerce, both made from the pine tree, combined in proportions differing according to the hardness of surface required, being generally in about the proportion of one barrel of rosin to four barrels of tar, with the addition, also, of brimstone, in cases where the gravel or other hard substances, to be used in connection with the compound, have not, as they sometimes have, an adhesive substance adhering to them or mixed with them in their natural state. I combine the said two, or, as the case may be, three substances, by boiling the tar in one vessel, melting and boiling the rosin in another, and mixing the two, while boiling hot, in a third vessel, adding the brimstone, when it is used, after they are thus mixed, or before, by adding it to the boiling tar. The greater the proportion of rosin to tar, the harder will the surface be. If too much rosin is added, the surface will be too hard and brittle; if too little, it will be too soft. The proportion of brimstone to be used depends upon the character of the gravel or other material. I generally use, for ordinary gravel, about two pounds to a barrel of tar.

The substance or combination thus formed is to be applied and used in the following manner:

A foundation or lower stratum is first made, composed of the said compound, intermixed with hard substances, as coarse gravel, broken stone, iron-cinders or refuse, broken glass, or other like material, in size not to exceed that of a hen's egg. The compound, heated as aforesaid, is to be poured hot among the materials adopted, with a view to, and in such quantity as will coat or smear each and every particle with a coating of the compound, and in order to secure a thorough and even distribution, the material is to be afterward carefully stirred and mixed. The material thus prepared is then to be laid and spread evenly upon the ground, or other base, to the desired thickness, generally two or three inches. It is then to be carefully and thoroughly rolled, with heavy iron or stone rollers, until the substances and particles are thoroughly compacted together. The work is then allowed to stand until the material has hardened somewhat; a day or two will generally be sufficient.

The surface or upper stratum is then prepared, by intermixing the said compound in a similar manner, with a finer gravel or sharp sand, the latter to be first heated in order to expel the moisture. This mixture is then spread, in one or more layers, upon the foundation, and rolled in a similar manner, and allowed to harden, and the work is then complete, ready for use and travel.

The lower stratum, or foundation, may be laid upon the natural soil, or upon brick, stone, or wooden pavements, or floors.

I claim that a pavement or covering made with the above described compound or combination, will be found the simplest, cheapest, and most durable of any yet invented or discovered.

What I claim as my own invention and discovery, is—

The combination of the said materials, pine tar and rosin, and the combination of these two materials with brimstone, when found necessary, as and for a cement, to be used and employed with sand, gravel, and other hard substances of small size, as above described, in the making of concrete pavements, flaggings, walks, roofs, and floors.

ABRAHAM B. McKEON.

Witnesses:
THOMAS COSTIGAN,
SIMON TOWLS.